July 24, 1928.                A. J. MARSHALL                1,678,261
                                SIDE LIGHT
                            Filed July 23, 1927
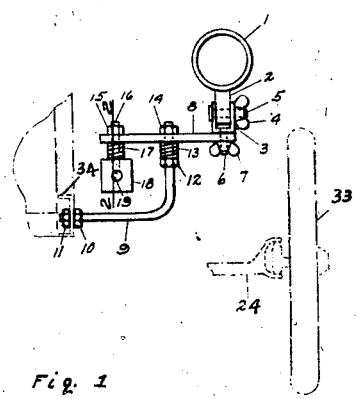
Fig. 1
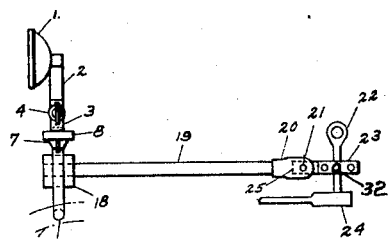
Fig. 2
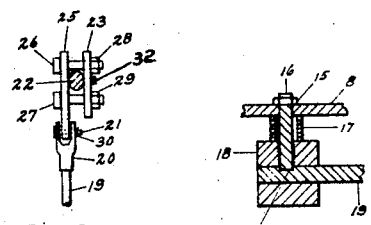
Fig. 3    Fig. 4
INVENTOR
ARTHUR J. MARSHALL
BY
ATTORNEY Patented July 24, 1928.

1,678,261

UNITED STATES PATENT OFFICE.

ARTHUR J. MARSHALL, OF DALTON, MASSACHUSETTS, ASSIGNOR OF ONE-FOURTH TO EDWARD T. HEAPHY, OF LEE, MASSACHUSETTS, AND ONE-FOURTH TO WILLIAM A. HEAPHY, OF PITTSFIELD, MASSACHUSETTS.

SIDE LIGHT.

Application filed July 23, 1927. Serial No. 208,031.

This invention relates to a side light that is mounted on an independent bracket arm below the head light of an automobile, and has for its principal object to provide simple and efficient lighting means for the side of the road adjacent the front wheel of the vehicle.

A further object of the invention is to provide a side light of this character that is operated from the steering rod of an automobile, and to cause the beam of light to follow the direction of the wheel adjacent thereto, and which will be efficient and reliable in operation so as to accomplish the function desired therefor.

With the foregoing objects outlined and with other objects in view which will appear as the description proceeds, the invention consists in the novel features hereinafter described in detail, illustrated in the accompanying drawing and more particularly pointed out in the appended claims.

Referring to the drawing in which like numerals indicate like parts:—

Figure 1 is a front elevation view of my device.

Figure 2 is a side elevation view.

Figure 3 is a detail view showing the method of connecting to the steering rod.

Figure 4 is an enlarged sectional view on the line 2—2 of Figure 1.

As illustrated in the accompanying drawings, 9 indicates a bracket arm that is secured to the forward end of the chassis 34, in front of the apron extending from the mud guard, and fastened thereto by means of the nuts 10 and 11. In this particular case the bracket arm 9 is shown formed at a right angle, but the contour of the bracket arm may be changed so that the device may be adapted to various makes of automobiles without departing from the spirit of my invention. The bracket arm 9 is provided with a nut 12 and a compression spring 13 is placed over the bracket arm 9 and in contact with the nut 12. A cross arm 8 is pivotally connected to the bracket arm 9 and fastened thereto and held in contact with the compression spring 13 by means of the nut 14. The purpose of the compression spring 13 is to absorb shocks and jars due to vibrations caused when the vehicle is in motion, and to eliminate as far as possible vibration of the side light 1.

A connecting rod support 18 is secured to the inner end of the cross arm 8 by means of the stud 16 and the nut 15, and the cross arm is free to rotate about the stud 16. A compression spring 17 is placed over the stud 16 and compressed and held in contact with the under side of the cross arm 8 and the top of the connecting rod support 18. The purpose of the compression spring 17 is to eliminate vibration as far as possible and also to act as a lock for the nut 15. The connecting rod 19 is provided with a recess 31 and the stud 16 is threaded into the connecting rod support 18 and sets into the recess 31 on the connecting rod 19 to prevent any motion of the same. The connecting rod is provided with a clevis 20 which is pivotally connected to the clevis strap 25 by means of the pin 21, which pin is held in position by a cotter pin 30. The clevis strap 25 and the side strap 23 are rigidly secured to the steering rod 22 by means of the bolts 27 and the nuts 29, and further secured thereto by means of a set screw 32 on the side strap 23.

A side light 1 is mounted on the outer end of the cross arm 8 by means of a depending strap 2 which sets into a U-shaped bracket 3 and held in contact with the U-shaped bracket 3 by means of a bolt 5 and a wing nut 4. The U-shaped bracket 3 is secured to the cross arm 8 by means of a bolt 6 and the wing nut 7. By using this method of mounting the side light 1 I am able to focus the side light by means of the bolt 5 and the wing nut 4 as the depending strap 2 is free to rotate about the bolt 5.

The operation of the device is as follows:

When motion is imparted to the steering rod 22 it will move in a backward or forward direction in accordance with the will of the operator of the vehicle, and when the steering rod 22 is caused to move forward the driving rod 24 of the vehicle and the connecting rod 19 will also move forward. This forward motion will cause the wheel 33 to turn in a certain direction, and the forward motion on the connecting rod 19 will cause the cross arm 8 to rotate about the bracket arm 9 and the stud 16 in the direction in which the wheel 33 is turning and the beam from the side light will also follow the course of the wheel 33.

What I claim is:

1. The combination of an adjustable side light mounted on a cross arm, the cross arm pivotally connected to a bracket arm adapted to be secured to the chassis of an automobile, a connecting rod block pivotally connected to the inner and under side of the cross arm, a connecting rod rigidly attached to the said connecting rod block and extending therefrom and pivotally connected to the steering rod of an automobile, means to absorb shock and vibration on the said cross arm and side light, the steering rod, the connecting rod and the cross arm cooperating to provide the means to cause the side light to turn in the same direction as the wheel adjacent the said side light.

2. The combination of an adjustable side light mounted on a cross arm, the cross arm pivotally connected to a bracket arm adapted to be secured to the chassis of an automobile, a connecting rod block pivotally connected to the cross arm, a connecting rod rigidly attached to the connecting rod block and pivotally connected to the steering rod of an automobile, means to absorb shock and vibration on the said cross arm and side light.

3. The combination of an adjustable side light mounted on a cross arm, the cross arm pivotally connected to a bracket arm adapted to be secured to the chassis of an automobile, said cross arm extending in a direction parallel to the bracket arm, a connecting rod block pivotally connected to the inner side of the cross arm, a connecting rod rigidly connected to the connecting rod block and pivotally connected to the steering rod of an automobile, means to absorb shock and vibration on the said cross arm and side light.

4. The combination of an adjustable side light mounted on a cross arm, the cross arm pivotally connected to a bracket arm adapted to be secured to the chassis of an automobile, said cross arm extending in a direction parallel to the bracket arm, a connecting rod block pivotally connected to the inner side of the cross arm, a connecting rod rigidly connected to the connecting rod block and pivotally connected to the steering rod of an automobile.

In testimony whereof I affix my signature.

ARTHUR J. MARSHALL.